United States Patent
Kang et al.

(10) Patent No.: US 10,318,657 B2
(45) Date of Patent: Jun. 11, 2019

(54) SYSTEM AND METHOD FOR MITER AND NOTCH IDENTIFICATION FOR PATTERN SEW LINE GENERATION

(71) Applicant: SIEMENS PRODUCT LIFECYCLE MANAGEMENT SOFTWARE INC., Plano, TX (US)

(72) Inventors: Aarcus Kang, Concord, MA (US); Marc Attar, Somerville, MA (US); Fredrick Pennachi, Lincoln, MA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 284 days.

(21) Appl. No.: 15/281,259

(22) Filed: Sep. 30, 2016

(65) Prior Publication Data

US 2018/0096082 A1   Apr. 5, 2018

(51) Int. Cl.
  *G06F 17/10* (2006.01)
  *G06F 7/60* (2006.01)
  *G06F 17/50* (2006.01)
  *D05B 19/02* (2006.01)

(52) U.S. Cl.
  CPC ............ *G06F 17/50* (2013.01); *D05B 19/02* (2013.01); *G06F 17/5086* (2013.01)

(58) Field of Classification Search
  CPC ...... D05B 19/02; G06F 17/50; G06F 17/5086
  See application file for complete search history.

(56) References Cited

U.S. PATENT DOCUMENTS

| | | | |
|---|---|---|---|
| 9,053,287 B1 | 6/2015 | Acosta et al. | |
| 2004/0049309 A1* | 3/2004 | Gardner | A41H 1/00 700/132 |
| 2005/0119779 A1* | 6/2005 | Amico | G06K 9/481 700/132 |
| 2007/0118245 A1* | 5/2007 | Goldman | D05B 19/08 700/138 |
| 2014/0195203 A1* | 7/2014 | Lehrer | G06F 17/50 703/1 |
| 2017/0186217 A1* | 6/2017 | Oldach | G06T 19/00 |

* cited by examiner

Primary Examiner — Aniss Chad
Assistant Examiner — David A Hopkins

(57) ABSTRACT

A system and method is provided that facilitates miter and notch identification for pattern sew line generation. A processor of the system may be configured to access a pattern data that defines a flat shape with cut lines corresponding to locations at which the shape is cut out of a material. Based on the pattern data, the processor may generate a computer-aided-design (CAD) model that includes a plurality of curves that define boundary edges of an object that corresponds to the shape defined by the pattern data. In addition, the processor may automatically identify portions of the boundary edges that correspond to alignment guides including at least one miter alignment guide, notch recess alignment guide, notch projection alignment guide, or combination thereof. Further, the processor may include at least one sew line in the CAD model that is parallel to and offset by the at least one seam allowance distance from at least one boundary edge towards the interior of the CAD model, without being offset by the at least one seam allowance distance from portions of the at least one boundary edge that include the identified alignment guides.

20 Claims, 5 Drawing Sheets

SYSTEM AND METHOD FOR MITER AND NOTCH IDENTIFICATION FOR PATTERN SEW LINE GENERATION

TECHNICAL FIELD

The present disclosure is directed, in general, to computer-aided design (CAD), computer-aided manufacturing (CAM), computer-aided engineering (CAE), visualization, simulation, and manufacturing systems, product data management (PDM) systems, product lifecycle management (PLM) systems, and similar systems, that are used to create, use, and manage data for products and other items (collectively referred to herein as product systems).

BACKGROUND

Product systems may be used to generate and manipulate CAD models of products. Such systems may benefit from improvements.

SUMMARY

Variously disclosed embodiments include data processing systems and methods that may be used to facilitate miter and notch identification for pattern sew line generation. In one example, a system may comprise at least one processor configured to access pattern data that defines a flat shape with cut lines corresponding to locations at which the shape is cut out of a material, wherein the pattern data does not specify sew lines offset from the cut lines on an interior portion of the shape. Also, the at least one processor may be configured, based on the pattern data, to generate a computer-aided-design (CAD) model that includes a plurality of curves that define boundary edges of an object that corresponds to the shape defined by the pattern data. In addition, the at least one processor may be configured to automatically identify portions of the boundary edges that correspond to alignment guides including at least one miter alignment guide, notch recess alignment guide, notch projection alignment guide, or combination thereof. The at least one processor may further be configured to include at least one sew line in the CAD model that is parallel to and offset by the at least one seam allowance distance from at least one boundary edge towards the interior of the CAD model, without being offset by the at least one seam allowance distance from portions of the at least one boundary edge that include the identified alignment guides.

In another example, a method for miter and notch identification and removal for pattern sew line generation may comprise through operation of at least one processor several acts. Such acts may include accessing pattern data that defines a flat shape with cut lines corresponding to locations at which the shape is cut out of a material, wherein the pattern data does not specify sew lines offset from the cut lines on an interior portion of the shape. These acts may also include, based on the pattern data, generating a CAD model that includes a plurality of curves that define boundary edges of an object that corresponds to the shape defined by the pattern data. In addition, these acts may include automatically identifying portions of the boundary edges that correspond to alignment guides including at least one miter alignment guide, notch recess alignment guide, notch projection alignment guide, or combination thereof. Further, these acts may include including at least one sew line in the CAD model that is parallel to and offset by the at least one seam allowance distance from at least one boundary edge towards the interior of the CAD model, without being offset by the at least one seam allowance distance from portions of the at least one boundary edge that include the identified alignment guides.

A further example may include a non-transitory computer readable medium encoded with executable instructions (such as a software component on a storage device) that when executed, causes at least one processor to carry out this described method.

Another example may include an apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
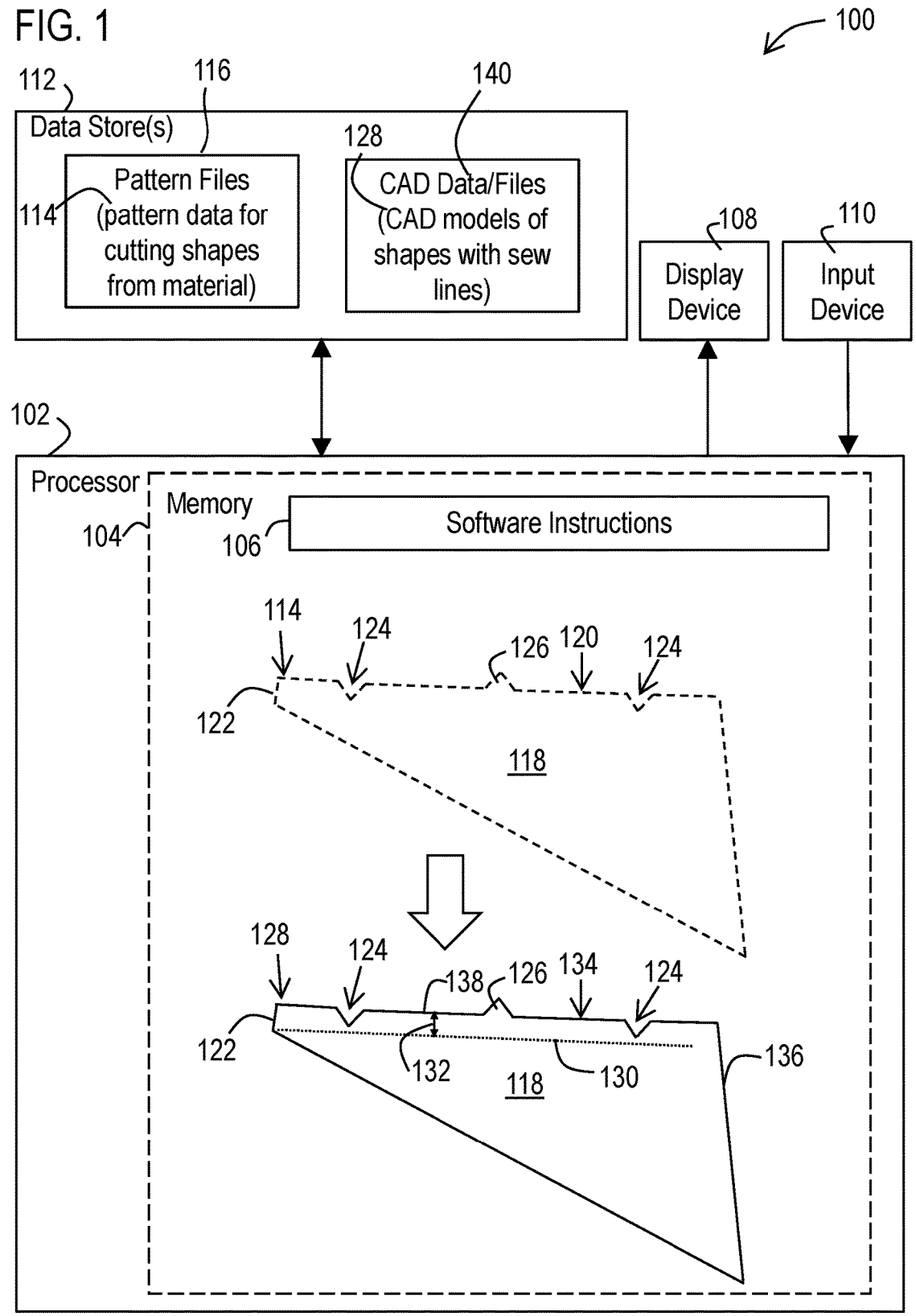
FIG. 1 illustrates a functional block diagram of an example system that facilitates miter and notch identification for pattern sew line generation.

Various technologies that pertain to systems and methods that facilitate miter and notch identification for pattern sew line generation will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

With reference to FIG. 1, an example data processing system 100 is illustrated that facilitates miter and notch identification for pattern sew line generation. The system 100 may include at least one processor 102 that is configured to execute software instructions 106 (included in at least one application software component) from a memory 104 accessed by the processor. The software instructions may be configured (i.e., programmed) to cause the processor to carry out various acts and functions described herein. For example, the described software instructions 106 may include and/or correspond to one or more components of a PLM software application that is configured to retrieve, generate, and store product data in a data store 112 such as a database (e.g., Oracle, Microsoft SQL Server), file system, hard drive, SSD, memory card and/or any other type of device or system that stores non-volatile data.

The described data processing system 100 may include at least one display device 108 and at least one input device 110. The display device, for example, may include an LCD display screen, monitor, and/or a projector. The input devices, for example, may include a mouse, pointer, touch screen, touch pad, drawing tablet, track ball, buttons, keypad, keyboard, camera, motion sensing device that captures motion gestures, and/or any other type of input device capable of providing the inputs described herein. For example, the processor 102, memory 104, software instructions 106, display device 108, and input device 110, may be included as part of a data processing system corresponding to a PC, workstation, server, notebook computer, tablet, mobile phone, or any other type of computing system, or any combination thereof.

Example embodiments may include software instructions 106 included by or used with computer-aided-design (CAD) software. Such software instructions may generate or may enable CAD software to produce CAD models and documentation from pattern data that defines shapes for objects that are cut out of flexible materials (e.g., leather, plastic, fabric, cloth). Such objects may correspond, for example, to portions of the outer coverings of seats that are stitched together to form a complete outer covering for a vehicle seat, or other type of material covered product.

Examples of PLM software applications that may be adapted to carry out the features and functions described herein may include engineering tools for vehicle interiors (e.g., seats) such as Siemens Mastertrim, as well as the NX suite of applications and/or Solid Edge software produced by Siemens Product Lifecycle Management Software Inc., of Plano, Tex., US. However, it should be appreciated that the systems and methods described herein may be used in other product systems and/or any other type of system that generates and stores product data in a database or that manipulates patterns and/or geometric models in a workspace with respect to vehicle interiors or any other type of sewn products.

As illustrated in FIG. 1, the at least one processor 102 may be configured (via the software instructions 106) to access pattern data 114 that defines a flat shape 118 with cut lines 120 corresponding to locations at which the shape is cut out of a material. Such pattern data may be accessed from at least one pattern file 116 in an AAMA or ASTM DXF format. Such pattern data may also be accessed from data records stored in a database or received from another application or system that is operative to provide pattern data.

In example embodiments, the shape 118 includes a plurality of alignment guides 122, 124, 126. FIG. 1 illustrates different types of alignment guides that may be found on the shapes defined be the pattern data, such as a miter alignment guide 122, a notch recess alignment guide 124, and a notch projection alignment guide 126. It should be appreciated that pattern data may include one or more of these different types of alignment guides.

Figure 2:
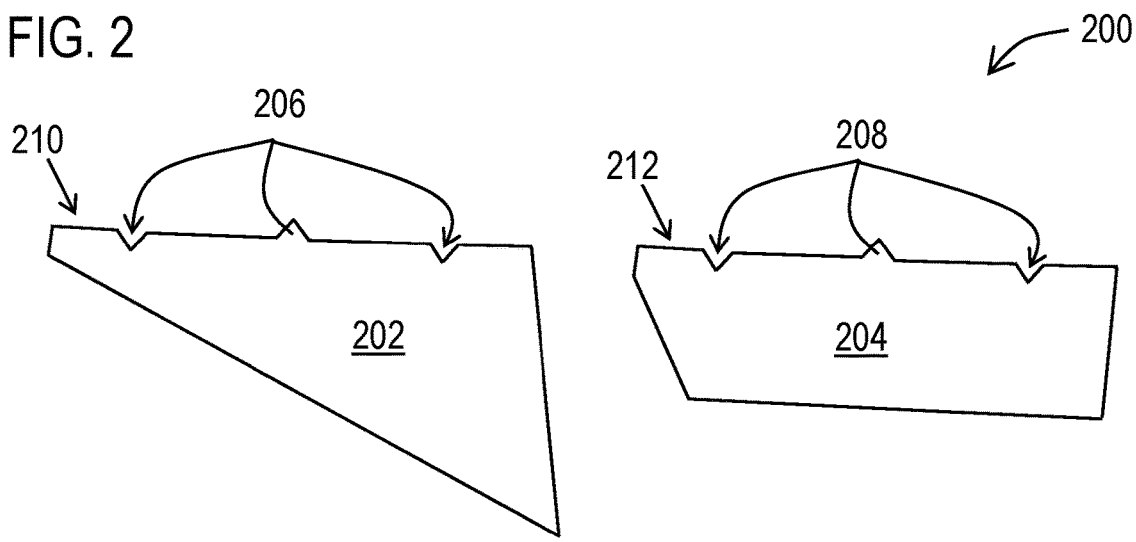
FIG. 2 illustrates an example of two pieces of material that include alignment guides.

Such alignment guides are used to facilitate alignment of different pieces of material having shapes defined by the pattern data, prior to such pieces of material being sewn together. FIG. 2 illustrates an example 200 of two pieces 202, 204 of material separate from each other that are intended to be sewn together. Each includes alignment guides 206, 208 along their respective boundary side edges 210, 212 that are intended to be sewn together.

Figure 3:
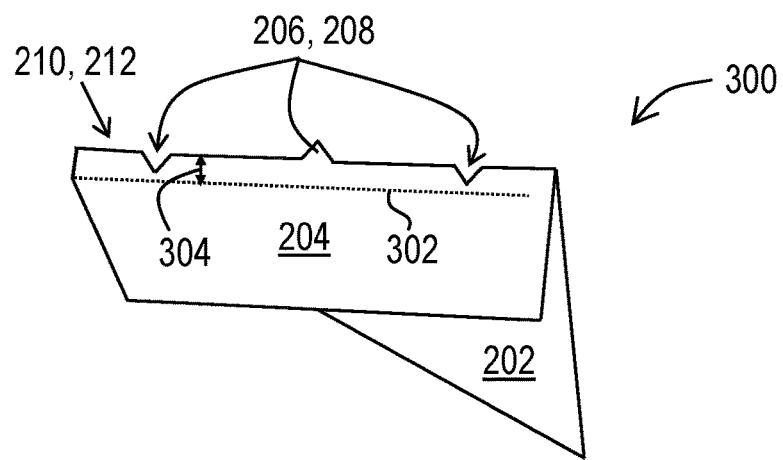
FIG. 3 illustrates an example of the two pieces of material stacked with their alignment guides aligned and sewn together at a sew line.
Figure 4:
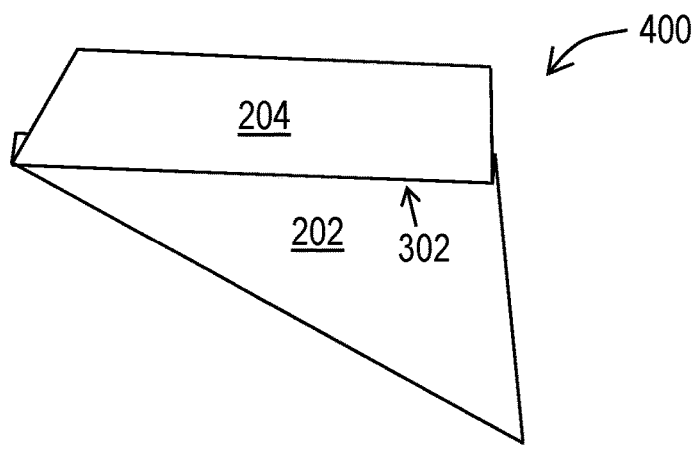
FIG. 4 illustrates an example of the two pieces of material sew together opened up.

As illustrated in the example 300 in FIG. 3, a user (or machine) may stack these pieces 202, 204 of material such that their respective alignment guides 206, 208 are aligned (e.g., one above the other) and may then sew the pieces together with at least one thread that is applied along a sew line 302 (which may be curved or straight). Such a sew line 302 may be located at a seam allowance distance 304 (e.g., an offset distance) from the aligned boundary side edges 210, 212 of the two pieces. FIG. 4 illustrates an example 400 of the two pieces after being sewn together and folded open along the original sew line 302.

In example embodiments, the location of such sew lines may not be included in the pattern data. For example, as illustrated in FIG. 1, the location of sew lines are not included in the pattern data 114.

Referring to FIG. 1, an example embodiment of the software instructions 106 is operative to cause the processor to determine where one or more sew lines 130 are to be placed in a CAD model 128 that correspond to the shape 118 defined in the pattern data 114 based on one or more predetermined seam allowances distances 132. Such determined sew lines 130 may be included in the CAD model for documentation purposes (e.g., to document in the CAD model the location of a sew line in order to represent the manner in which the piece of material is to be sewn to another piece of material). Such sew lines may also be used by further software components included by or used with the CAD software to validate the manner in which pieces of material are sewn together so as to verify that a particular design meets various design specification for the final sewn object (e.g., a seat covering).

In an example embodiment, the processor may be configured to generate (based on the pattern data) the CAD model 128 that includes a plurality of curves 134 (corresponding to straight or curved lines) that when connected together at vertices define boundary edges 138 of an object 136 (e.g., a piece of material) that corresponds to the shape 118 defined by the pattern data.

The at least one sew line 130 added to the CAD model may correspond to an additional documentation line that illustrates a location of where to stitch the object to another object. Data representative of the CAD model (including at least one sew line) may be stored in the memory 104 and may be saved to one or more data stores 112 in the form of CAD data 140. Such CAD data may correspond, for example, to a CAD file in a format such as JT or STEP for storing geometric curves that define the shape of the CAD model of the object.

In order to generate the at least one sew line 130 along a boundary edge 138, the processor may be configured to automatically identify portions of the boundary edge 138 that correspond to the alignment guides 122, 124, 126. In this example, such alignment guides may be identified automatically (e.g., without user inputs selecting each alignment guide).

In general, a miter alignment guide that is identifiable in pattern data corresponds to a boundary edge in which a small amount of material (such as a corner) has been cut away. Also, in general a notch recess alignment guide 124 corresponds to a triangular or rectangular recess that is cut into a boundary edge. In addition, in general a notch projection alignment guide 126 corresponds to extra material with a triangular or rectangular shape that projects outwardly from a relatively longer boundary edge.

Such alignment guides may be automatically identified by the processor so that the processor can ignore them when determining where to add the sew line 130 in the CAD model 128 based on a predetermined seam allowance distance 132 from portions of the boundary edge 138 of the CAD model that do not include the alignment guides. It should be appreciated that if the notch type alignment guides were not identified and ignored, the sew line 130 (generated as an offset from a boundary edge 138) would not be a generally smooth straight or curved line as shown in FIG. 1, but would be more jagged based on being offset from the triangular edges of the alignment guides 124, 126. Also it should be appreciated that if the miter alignment guide 122 was not ignored, the sew line 130 may be too short in length by a seam allowance distance from the edge of the miter alignment guide. For example, if the miter alignment guide had not been present, the CAD model 128 would have been longer in the area of the miter alignment guide. Thus by ignoring the miter alignment guide the sew line may extend longer in the direction of the miter alignment guide.

In this example, the processor may be configured to include at least one sew line 130 in the CAD model that is parallel to and offset by the at least one seam allowance distance from at least one boundary edge 138 towards the interior of the CAD model, without being offset by the at least one seam allowance distance from portions of the at least one boundary edge 138 that include the identified alignment guides 122, 124, 126.

In an example embodiment, such a sew line may be added by the processor determining a new edge curve corresponding to the boundary edge 138 in which the alignment guides 122, 124, 126 have been removed. Adjacent curves on the opposite sides of the removed notch recesses 124 or projections 126 may then be connected together to form the new edge curve. Such a new edge curve may be increased in length to extend passed where the miter cut was present by a distance that is based on at least one of the length of the curve that represents the miter and/or the seam allowance distance. The sew line may then correspond to an additional curve that is added to the CAD model that is offset from the new edge curve by the seam allowance distance. To complete the process, the new edge curve may be removed, leaving the original boundary edge 138 (with the original alignment guides) and with the new sew line added to the CAD model.

In example embodiments, each of the different types of alignment guides may be comprised of curves with particular dimensions and angles relative to other curves of the CAD model and/or seam allowance distances that enable them to be identifiable as alignment guides. The processor may be configured to identify such alignment guides from the typically larger, straight, concave, and/or convex boundary edges that extend between and/or on either side of the alignment guides.

For example, the processor 102 may be configured to identify a notch recess or a notch projection alignment guide by making several determinations that in combination are indicative thereof. Such determinations may include determining that the notch recess or the notch projection alignment guide is represented in the CAD model by two or three curves. Such determinations may also include determining that the two or three curves are each in length less than twice the at least one seam allowance distance at the location of the notch alignment guide. Further, such determinations may include determining that the two or three curves each have a minimum direction change of at least 20 degrees from each other and from adjacent curves on the boundary edges connected directly to at least two of the two or three curves. In addition, such determinations may include determining that adjacent curves on the boundary edges connected to at least two of the two or three curves extend along vectors that are coincident with each other or are at an angle with respect to each other that is less than 15 degrees.

Figure 5:
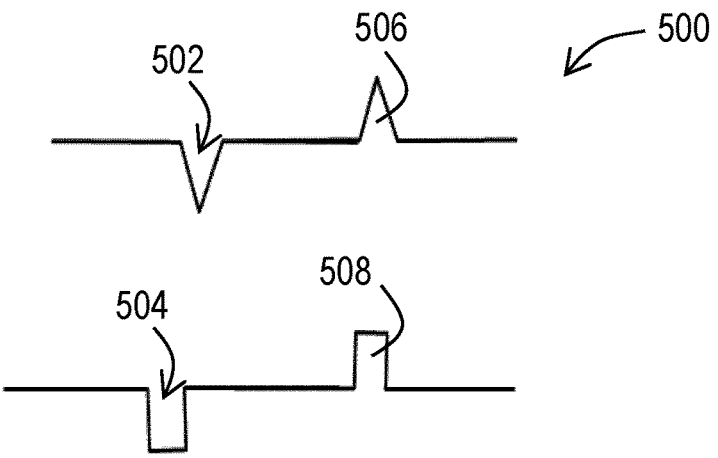
FIG. 5 illustrates an example of V-notch and castle-notch type alignment guides.

FIG. 5 shows a schematic diagram 500 of example types of notch recess 502, 504 and projection 506, 508 type alignment guides that may be identified in this described manner. Such notch type alignment guides may have a shape of a V (V-Notch) 502, 504 (made of two curves in the CAD model) or a rectangle (Castle-Notch) 506, 508 (made of three curves in the CAD model).

Figure 6:
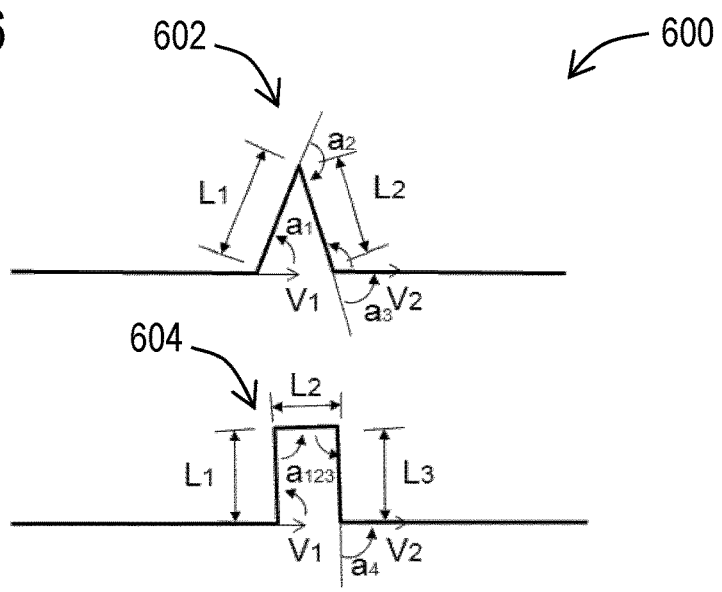
FIG. 6 illustrates an example of features usable to identify notch type alignment guides.

FIG. 6 shows a schematic diagram 600 of example features that such notch type alignment guides 602, 604 may have in order to be identified as a notch type alignment guide according to the previously described determinations. In particular, to identify a notch type alignment guide, a group of connected curves may need to satisfy the following rules: curve group size; length limit; angle limit; and edge alignment, which are evaluated by the at least one processor.

To satisfy the curve group size rule, the number of connected curves is either two (for V-Notch 602) or three (for Castle-Notch 604). To satisfy the length limit rule, each curve in the group has a length (L) that is less than the threshold value (Lmax) (i.e., L<Lmax.). As discussed previously, in example embodiment the Lmax threshold value may be two times the seam allowance at the location of the notch type alignment guide.

In addition, to satisfy the angle limit rule, each curve in the group has a minimum direction change (a) from the previous curve on the boundary edge (e.g., counter-clockwise) of a minimum angle ($a_{min}$) (i.e., angle limit: $|a|>a_{min}$). As discussed previously, in example embodiment the minimum angle ($a_{min}$) may be 20 degrees.

Also, to satisfy the edge alignment rules, the curves before and after the notch curves should substantially align. Referring to FIG. 6, substantially align may correspond to an angle between vector V1 and V2 that is less than the threshold value $a_{max}$, (i.e., |a(V1,V2)|<amax). As discussed previously, in example embodiment the maximum angle ($a_{max}$) may be 15 degrees.

With respect to miter alignment guides, the processor 102 may be configured to identify a miter alignment guide by making several determinations that in combination are indicative thereof. Such determinations may include determining that the miter alignment guide is represented in the CAD model by a single curve having a length that is less than twice the seam allowance distance at the location of the miter. Also, such determinations may include determining that direction changes from the single curve of the miter alignment guide to adjacent curves on the boundary edges connected directly to each side of the single curve of the miter alignment guide are at least 15 degrees.

FIG. 1 shows an example of a miter alignment guide 122 that may be identified in this described manner. Such a miter alignment guide corresponds to a straight cut at the corner of the shape 118. The purpose of the miter cut is to remove extra material and provide alignment for sewing purposes. The miter cut may be represented in the CAD model 128 by a single short curve.

Figure 7:
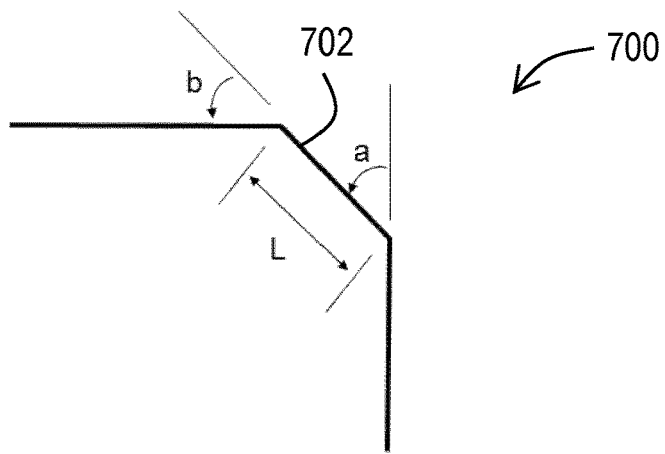
FIG. 7 illustrates an example of features usable to identify miter alignment guides.

FIG. 7 shows a schematic diagram 700 of example features that such miter alignment guides 702 may have in order to be identified as a miter alignment guide according to the previously described determinations. In particular, to identify a miter alignment guide (from all the curves comprising the boundary edge), a single curve in the CAD model may need to satisfy the following rules: length limit; first angle limit; and second angle limit, which are evaluated by the at least one processor.

To satisfy the length limit rule, the length of the miter curve (L) is less than the threshold value (Lmax) (i.e., L<Lmax). As discussed previously, in example embodiment the Lmax threshold value for miter alignment guide determination may be two times the seam allowance in the location of the miter alignment guide.

To satisfy the first angle limit rule, the angle (a) between the previous curve and the single curve of the miter alignment guide (e.g., counter-clockwise) is greater than a first angle threshold ($a_{min}$) (i.e., a>$a_{min}$). Also to satisfy the second angle limit rule, the angle (b) between the single curve of the miter alignment guide and the next curve (e.g., counter-clockwise) is greater than a second angle threshold ($b_{min}$) (i.e., b>$b_{min2}$). As discussed previously, in example embodiment the $a_{min}$ and $b_{min}$ thresholds for miter alignment guide determination may be 15 degrees.

It should be understood that in alternative embodiments, these rule values (e.g., Lmax, $a_{min}$, $a_{max}$, for notches; or Lmax, $a_{min}$, $b_{min}$ for miters) may have other values depending on the pattern data that is provided to the system. Also, the seam allowance and these rule values may be configurable parameters. For example, the software instructions 106 may cause the processor to generate a user interface having a menu or window that permits a user (via at least on input) to input and/or modify the value of the seam allowance and/or rule values described herein for identifying notch type alignment guides and miter type alignment guides.

In example embodiments, the processor may be configured (via the software instructions) to automatically identify the alignment guides in the manner described previously without basing the identification of the alignment guides on inputs through an input device that identify at least one of the alignment guide on the CAD model. Thus, the described system may perform the described functions without requiring possible tedious and time-consuming human interaction of identifying alignment guides on patterns in a CAD model. Rather the user may focus their time on final inspection and useful adjustments to the generated CAD models. In other words, the described system may allow the workflow of importing patterns to be streamlined into corresponding CAD models with minimum human interaction. Thus, the described system may improve the productivity of the trim engineers that need to import patterns for analysis and documentation purposes.

In an example embodiment, the described software instructions may correspond to a batch conversion tool that accesses CAD software to carry out at least some of the features described herein via a CAD API. However, it should be appreciated that in alternative embodiments the described software instructions may be configured to generate CAD models (that include sew lines) in CAD files from pattern data files (that do not include sew lines) without accessing CAD software. Also, it should also be appreciated that the described software instructions be configured to generate a user interface which enables a user to select individual pattern data files (via inputs thorough the input device 110) to generate and optionally display a corresponding CAD model (with an added sew line) in a workspace of a CAD software application that is displayed thorough the display device 108.

Figure 8:
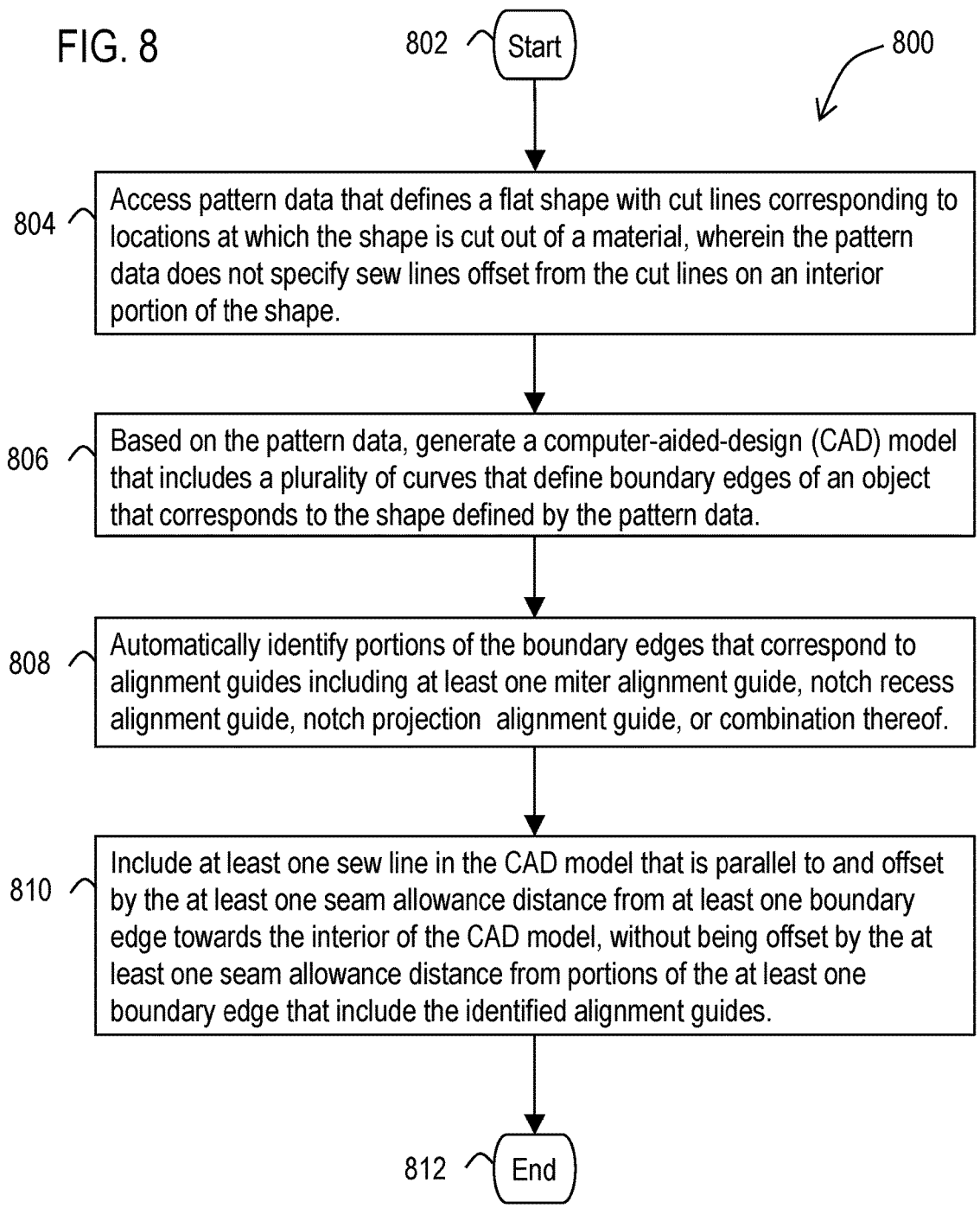
FIG. 8 illustrates a flow diagram of an example methodology that facilitates miter and notch identification for pattern sew line generation.

With reference now to FIG. 8, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer-executable instructions may include a routine, a sub-routine, programs, applications, modules, libraries, and/or the like. Still further, results of acts of the methodologies may be stored in a computer-readable medium, displayed on a display device, and/or the like.

Referring now to FIG. 8, a methodology 800 is illustrated that facilitates miter and notch identification for pattern sew line generation. The methodology may start at 802 and may include several acts carried out through operation of at least one processor. These acts may include an act 804 of accessing pattern data that defines a flat shape with cut lines corresponding to locations at which the shape is cut out of a material, wherein the pattern data does not specify sew lines offset from the cut lines on an interior portion of the shape. The methodology may also include an act 806 of based on the pattern data, generating a computer-aided-design (CAD) model that includes a plurality of curves that define boundary edges of an object that corresponds to the shape defined by the pattern data. Also, the methodology may include at act 808 of automatically identifying portions of the boundary edges that correspond to alignment guides including at least one miter alignment guide, notch recess alignment guide, notch projection alignment guide, or combination thereof. In addition, the methodology may include at act 810 of including at least one sew line in the CAD model that is parallel to and offset by the at least one seam allowance distance from at least one boundary edge towards the interior of the CAD model, without being offset by the at least one seam allowance distance from portions of the at least one boundary edge that include the identified alignment guides. At 812 the methodology may end.

It should be appreciated that the methodology 800 may include other acts and features discussed previously with respect to the data processing system 100. For example, the act 808 of automatically identifying portions of the boundary edges that correspond to alignment guides may be carried out without basing the identification of the alignment guides on inputs through an input device that identify the individual locations of alignment guides on the CAD model. Also, the act 808 of automatically identifying portions of the boundary edges that correspond to alignment guides may include both: identifying portions of the boundary edges of the CAD model that correspond to the at least one miter alignment guide; and identify portions of the boundary edge that correspond to at least one of the notch recess, notch projection, or combination thereof.

The example methodology 800 may also include an act of saving the CAD model including the at least one sew line to at least one data store. In addition, the methodology may include an act of causing the CAD model including the at least one sew line to be displayed through a display device.

In example embodiments, the act 808 of automatically identifying portions of the boundary edges that correspond to the notch recess or the notch projection alignment guide may include determining that: the notch recess or the notch projection alignment guide is represented in the CAD model by two or three curves; the two or three curves are each in length less than twice the at least one seam allowance distance at the location of the notch; the two or three curves each have a minimum direction change of at least a first angle threshold from each other and from adjacent curves on the boundary edges connected directly to at least two of the two or three curves; and the adjacent curves on the boundary edges connected to at least two of the two or three curves extend along vectors that are coincident with each other or are at an angle with respect to each other that is less than a second angle threshold.

Also, in example embodiments, the act 808 of automatically identifying portions of the boundary edges that correspond to a miter alignment guide may include determining that: the miter alignment guide is represented in the CAD model by a single curve having a length that is less than twice the seam allowance distance at the location of the miter alignment guide; and direction changes from the single curve of the miter alignment guide to adjacent curves on the boundary edges connected directly to each side of the single curve of the miter alignment guide are at least a third angle threshold.

As discussed previously, such a first angle threshold may be 20 degrees, and such second and third angle thresholds may be 15 degrees. However, in alternative embodiments, different values for these thresholds may be used depending on the sizes and shapes of the alignment guides included in the pattern data.

As discussed previously, acts associated with these methodologies (other than any described manual acts) may be carried out by one or more processors. Such processor(s) may be included in one or more data processing systems, for example, that execute software components (including software instructions) operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software code/environments/languages/frameworks such as machine code, assembly language, Java, JavaScript, Python, C, C#, C++ or any other software tool capable of producing software components and user interfaces configured to carry out the acts and features described herein.

Figure 9:
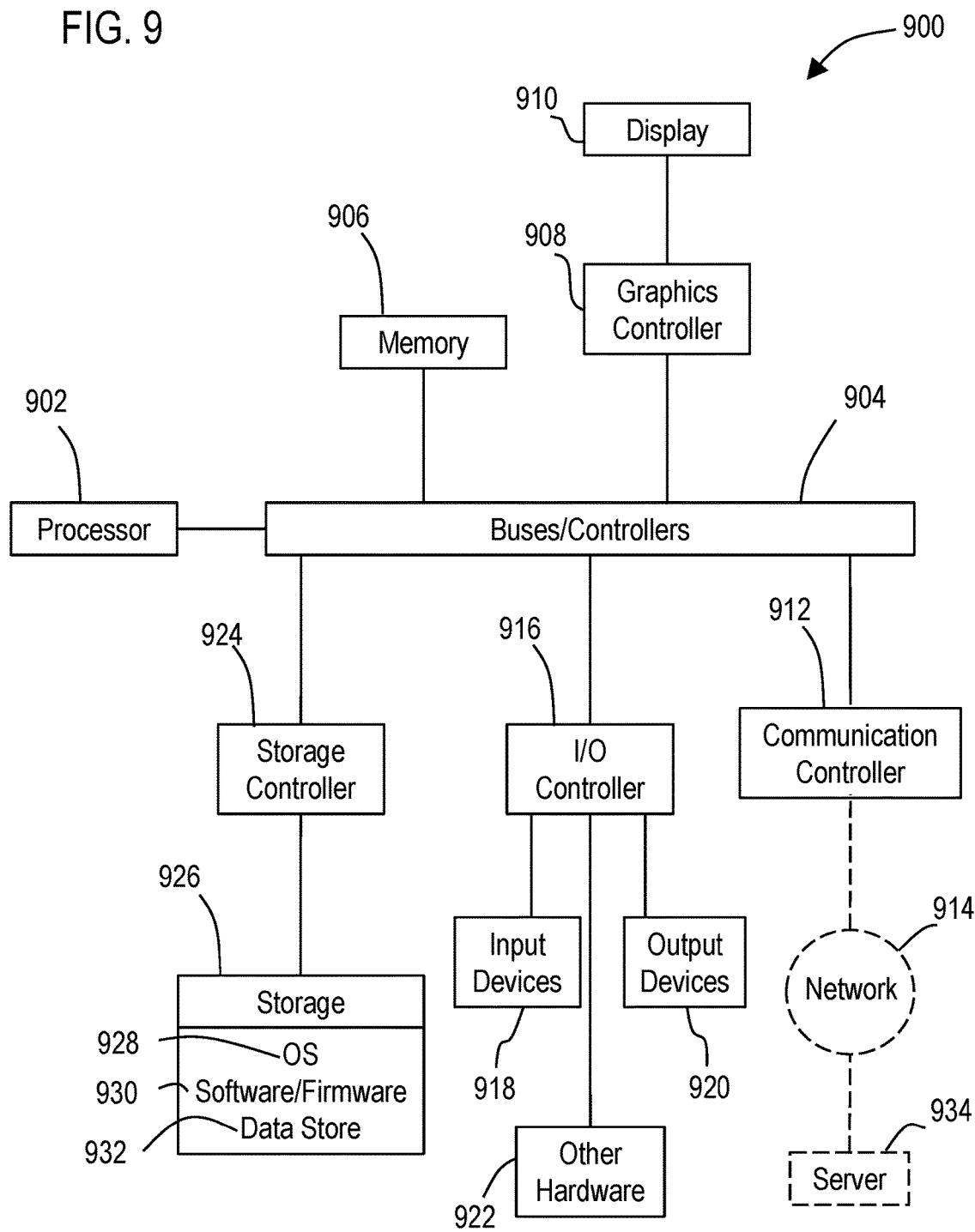
FIG. 9 illustrates a block diagram of a data processing system in which an embodiment may be implemented.

FIG. 9 illustrates a block diagram of a data processing system 900 (e.g., a computer system) in which an embodiment can be implemented, for example, as a portion of a product system, and/or other system operatively configured by software or otherwise to perform the functions and processes as described herein. The data processing system depicted includes at least one processor 902 (e.g., a CPU) that may be connected to one or more bridges/controllers/buses 904 (e.g., a north bridge, a south bridge). One of the buses 904, for example, may include one or more I/O buses such as a PCI Express bus. Also connected to various buses in the depicted example may include a main memory 906 (RAM) and a graphics controller 908. The graphics controller 908 may be connected to one or more display devices 910. It should also be noted that the processor 902 may include a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 912 (Ethernet controllers, WiFi controllers, cellular controllers) operative to connect to a local area network (LAN), Wide Area Network (WAN), a cellular network, and/or other wired or wireless networks 914 or communication equipment.

Further components connected to various busses may include one or more I/O controllers 916 such as USB controllers, Bluetooth controllers, and/or dedicated audio controllers (connected to speakers and/or microphones). It should also be appreciated that various peripherals may be connected to the I/O controller(s) (via various ports and connections) including input devices 918 (e.g., keyboard, mouse, pointer, touch screen, touch pad, drawing tablet, trackball, buttons, keypad, game controller, gamepad, camera, microphone, scanners, motion sensing devices that capture motion gestures), output devices 920 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 902 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 922 connected to the I/O controllers 916 may include any type of device, machine, or component that is configured to communicate with a data processing system.

Additional components connected to various busses may include one or more storage controllers 924 (e.g., SATA). A storage controller may be connected to a storage device 926 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 904 such as a PCI Express bus.

A data processing system in accordance with an embodiment of the present disclosure may include an operating system 928, software/firmware 930, and data stores 932 (that may be stored on a storage device 926 and/or the memory 906). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 912 may be connected to the network 914 (which may or may not be a part of a data processing system 900), which can be any local, wide area, remote, private, and/or public data processing system network or combination of networks, as known to those of skill in the art, including the Internet. Data processing system 900 can communicate over the network 914 with one or more other data processing systems such as a server 934 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 902 and associated components may correspond to the combination of one or more virtual machine processors operating in a physical data processing system such as one or more physical servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 900 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Also, it should be noted that the processor described herein may correspond to a remote processor located in a data processing system such as a server that is remote from the display and input devices described herein. In such an example, the described display device and input device may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client data processing system may execute a web browser or thin client application. Inputs from the user may be transmitted from the web browser or thin client application to be evaluated on the server, rendered by the server, and an image (or series of images) sent back to the client data processing system to be displayed by the web browser or thin client application. Also in some examples, the remote processor described herein may correspond to a combination of a virtual processor of a virtual machine executing in a physical processor of the server.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device. Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes.

Also, at least one processor that is "configured to" carry out one or more functions or processes is defined herein as the combination of the at least one processor and the particular software/firmware instructions and/or wired circuits that when executed/operated by the at least one processor cause the at least one processor to carry out the one or more functions or processes described or recited herein. A processor that is configured to carry out a particular function/process may correspond to the combination of the processor and the software/firmware instructions in which the processor is actively executing at least portions of the software/firmware instructions that are loaded into a volatile memory (e.g., RAM, CPU cache) and that are programmed to cause the processor to carry out the described or recited function/process. In addition, a processor that is configured to carry out a particular function/process may correspond to the combination of the processor and the software/firmware instructions in which the software/firmware instructions are stored in a non-volatile memory or storage device (e.g., flash memory, SSD, hard drive) in operative connection with the processor such that the software/firmware instructions are available to be executed by the processor to carry out the described function/process (even though none, or only portions of the software/firmware instructions are currently being executed by the processor).

For example, a processor that is configured in the manner described or recited herein may include a processor that is in an off, sleep, or hibernation state (or is executing other processes), but still has software/firmware instructions (capable of causing the processor to carry out the functions described/recited herein for which it is configured) presently installed on a non-volatile memory or storage device in operative connection with the processor (in a data processing system) that enables the software/firmware instructions to be accessed and executed in response to receipt of one or more manual, internal, and/or external inputs/events/signals when the processor is running.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 900 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for miter and notch identification for pattern sew line generation comprising:
    at least one processor configured to:
        access pattern data that defines a flat shape with cut lines corresponding to locations at which the shape is cut out of a material, wherein the pattern data does not specify sew lines offset from the cut lines on an interior portion of the shape;
        based on the pattern data, generate a computer-aided-design (CAD) model that includes a plurality of curves that define boundary edges of an object that corresponds to the shape defined by the pattern data;
        automatically identify portions of the boundary edges that correspond to alignment guides including at least one miter alignment guide, notch recess alignment guide, notch projection alignment guide, or combination thereof;
        after identification of the edges of the portions of the boundary edges that correspond to the alignment guides, place at least one sew line in the CAD model that is parallel to and offset by the at least one seam allowance distance from at least one boundary edge towards the interior of the CAD model, without being offset by the at least one seam allowance distance from portions of the at least one boundary edge that include the identified alignment guides.

2. The system according to claim 1, wherein the processor is configured to automatically identify the alignment guides without basing the identification of the alignment guides on inputs through an input device that identify individual locations of alignment guides on the CAD model, wherein the at least one processor is configured to identify portions of the boundary edges of the CAD model that correspond to the at least one miter alignment guide, wherein the at least one processor is configured to identify portions of the boundary edge that correspond to at least one of the notch recess, notch projection, or combination thereof, wherein the at least one processor is configured to save the CAD model including the at least one sew line to at least one data store.

3. The system according to claim 2, wherein the at least one processor is configured to cause the CAD model including the at least one sew line to be displayed through a display device.

4. The system according to claim 3, wherein the at least one processor is configured to identify the notch recess or the notch projection alignment guide by determining that:
the notch recess or the notch projection alignment guide is represented in the CAD model by two or three curves;
the two or three curves are each in length less than twice the at least one seam allowance distance at the location of the notch;
the two or three curves each have a minimum direction change of at least a first angle threshold from each other and from adjacent curves on the boundary edges connected directly to at least two of the two or three curves; and
the adjacent curves on the boundary edges connected to at least two of the two or three curves extend along vectors that are coincident with each other or are at an angle with respect to each other that is less than a second angle threshold.

5. The system according to claim 4, wherein the at least one processor is configured to identify a miter alignment guide by determining that both:
the miter alignment guide is represented in the CAD model by a single curve having a length that is less than twice the seam allowance distance at the location of the miter alignment guide; and
direction changes from the single curve of the miter alignment guide to adjacent curves on the boundary edges connected directly to each side of the single curve of the miter alignment guide are at least a third angle threshold.

6. The system according to claim 5, wherein the first angle threshold is 20 degrees, wherein the second and third angle thresholds are 15 degrees.

7. The system according to claim 1, wherein the pattern data includes at least one pattern file in either an AAMA or ASTM DXF format.

8. A method for miter and notch identification for pattern sew line generation comprising:
through operation of at least one processor:
accessing pattern data that defines a flat shape with cut lines corresponding to locations at which the shape is cut out of a material, wherein the pattern data does not specify sew lines offset from the cut lines on an interior portion of the shape;
based on the pattern data, generating a computer-aided-design (CAD) model that includes a plurality of curves that define boundary edges of an object that corresponds to the shape defined by the pattern data;
automatically identifying portions of the boundary edges that correspond to alignment guides including at least one miter alignment guide, notch recess alignment guide, notch projection alignment guide, or combination thereof;
after identifying the portions of the boundary edges that correspond to the alignment guides, placing at least one sew line in the CAD model that is parallel to and offset by the at least one seam allowance distance from at least one boundary edge towards the interior of the CAD model, without being offset by the at least one seam allowance distance from portions of the at least one boundary edge that include the identified alignment guides.

9. The method according to claim 8, wherein automatically identifying portions of the boundary edges that correspond to alignment guides is carried out without basing the identification of the alignment guides on inputs through an input device that identify individual locations of alignment guides on the CAD model, wherein automatically identifying portions of the boundary edges that correspond to alignment guides includes both:
identifying portions of the boundary edges of the CAD model that correspond to the at least one miter alignment guide; and
identify portions of the boundary edge that correspond to at least one of the notch recess, notch projection, or combination thereof,
further comprising through operation of the at least one processor:
saving the CAD model including the at least one sew line to at least one data store.

10. The method according to claim 9, further comprising through operation of the at least one processor:
causing the CAD model including the at least one sew line to be displayed through a display device.

11. The method according to claim 10, wherein automatically identifying portions of the boundary edges that correspond to the notch recess or the notch projection alignment guide includes determining that:
the notch recess or the notch projection alignment guide is represented in the CAD model by two or three curves;
the two or three curves are each in length less than twice the at least one seam allowance distance at the location of the notch;
the two or three curves each have a minimum direction change of at least a first angle threshold from each other and from adjacent curves on the boundary edges connected directly to at least two of the two or three curves; and
the adjacent curves on the boundary edges connected to at least two of the two or three curves extend along vectors that are coincident with each other or are at an angle with respect to each other that is less than a second angle threshold.

12. The method according to claim 11, wherein automatically identifying portions of the boundary edges that correspond to a miter alignment guide includes determining that both:
the miter alignment guide is represented in the CAD model by a single curve having a length that is less than twice the seam allowance distance at the location of the miter alignment guide; and
direction changes from the single curve of the miter alignment guide to adjacent curves on the boundary edges connected directly to each side of the single curve of the miter alignment guide are at least a third angle threshold.

13. The method according to claim 12, wherein the first angle threshold is 20 degrees, wherein the second and third angle thresholds are 15 degrees.

14. The method according to claim 8, wherein the pattern data that is accessed includes at least one pattern file in either an AAMA or ASTM DXF format.

15. A non-transitory computer readable medium encoded with executable instructions that when executed, cause at least one processor to carry out a method for miter and notch identification for pattern sew line generation comprising:

accessing pattern data that defines a flat shape with cut lines corresponding to locations at which the shape is cut out of a material, wherein the pattern data does not specify sew lines offset from the cut lines on an interior portion of the shape;

based on the pattern data, generating a computer-aided-design (CAD) model that includes a plurality of curves that define boundary edges of an object that corresponds to the shape defined by the pattern data;

automatically identifying portions of the boundary edges that correspond to alignment guides including at least one miter alignment guide, notch recess alignment guide, notch projection alignment guide, or combination thereof;

generating at least one sew line in the CAD model that is parallel to and offset by the at least one seam allowance distance from at least one boundary edge towards the interior of the CAD model, without being offset by the at least one seam allowance distance from portions of the at least one boundary edge that include the identified alignment guides and doing so by ignoring the identified alignment guides when determining where to place the at least one sew line in the CAD model.

16. The computer readable medium according to claim 15, wherein automatically identifying portions of the boundary edges that correspond to alignment guides is carried out without basing the identification of the alignment guides on inputs through an input device that identify individual locations of alignment guides on the CAD model, wherein automatically identifying portions of the boundary edges that correspond to alignment guides includes both:

identifying portions of the boundary edges of the CAD model that correspond to the at least one miter alignment guide; and identify portions of the boundary edge that correspond to at least one of the notch recess, notch projection, or combination thereof, further comprising through operation of the at least one processor:

saving the CAD model including the at least one sew line to at least one data store.

17. The computer readable medium according to claim 16, further comprising through operation of the at least one processor:

causing the CAD model including the at least one sew line to be displayed through a display device.

18. The computer readable medium according to claim 17, wherein automatically identifying portions of the boundary edges that correspond to the notch recess or the notch projection alignment guide includes determining that:

the notch recess or the notch projection alignment guide is represented in the CAD model by two or three curves;

the two or three curves are each in length less than twice the at least one seam allowance distance at the location of the notch;

the two or three curves each have a minimum direction change of at least a first angle threshold from each other and from adjacent curves on the boundary edges connected directly to at least two of the two or three curves; and the adjacent curves on the boundary edges connected to at least two of the two or three curves extend along vectors that are coincident with each other or are at an angle with respect to each other that is less than a second angle threshold.

19. The computer readable medium according to claim 18, wherein automatically identifying portions of the boundary edges that correspond to a miter alignment guide includes determining that both:

the miter alignment guide is represented in the CAD model by a single curve having a length that is less than twice the seam allowance distance at the location of the miter alignment guide; and direction changes from the single curve of the miter alignment guide to adjacent curves on the boundary edges connected directly to each side of the single curve of the miter alignment guide are at least a third angle threshold.

20. The computer readable medium according to claim 19, wherein the first angle threshold is 20 degrees, wherein the second and third angle thresholds are 15 degrees.

* * * * *